United States Patent
Kimura

(10) Patent No.: US 8,022,871 B2
(45) Date of Patent: Sep. 20, 2011

(54) POSITIONING DEVICE, ELECTRONIC INSTRUMENT, AND STORAGE MEDIUM STORING PROGRAM

(75) Inventor: Akira Kimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/070,830

(22) Filed: Mar. 24, 2011

(65) Prior Publication Data
US 2011/0169694 A1    Jul. 14, 2011

Related U.S. Application Data

(63) Continuation of application No. 12/708,026, filed on Feb. 18, 2010, now Pat. No. 7,973,712, which is a continuation of application No. 11/839,624, filed on Aug. 16, 2007, now Pat. No. 7,692,581.

(30) Foreign Application Priority Data

Oct. 26, 2006  (JP) ................................. 2006-290819

(51) Int. Cl.
  *G01S 19/35*  (2010.01)
(52) U.S. Cl. ................................. 342/357.75
(58) Field of Classification Search ............. 342/357.75, 342/357.63
See application file for complete search history.

(56) References Cited

U.S. PATENT DOCUMENTS

| 5,781,156 | A | 7/1998 | Krasner |
| 5,832,022 | A | 11/1998 | Scott |
| 6,028,883 | A | 2/2000 | Tiemann et al. |
| 7,358,895 | B2 * | 4/2008 | Ziedan et al. ............ 342/357.62 |
| 7,413,973 | B2 * | 8/2008 | Park et al. ..................... 438/597 |
| 2006/0126703 | A1 | 6/2006 | Karna |

FOREIGN PATENT DOCUMENTS

| EP | 1209483 A2 | 5/2002 |
| JP | 2000-349681 A | 12/2000 |
| JP | 2004-012379 A | 1/2004 |
| JP | 2005-321298 A | 11/2005 |

* cited by examiner

*Primary Examiner* — Harry Liu
(74) *Attorney, Agent, or Firm* — Global IP Counselors, LLP

(57) ABSTRACT

A slice set for a specific period of time is acquired from a storage area of a memory which is a ring buffer while changing the read position, and the signal strength total value of each slice set is calculated. The signal strengths of the slices included in the maximum strength slice set and the signal strengths of the slices preceding or subsequent to the maximum strength slice set are calculated, and the final signal read position is determined based on a read offset of the maximum strength slice. A GPS satellite signal is acquired and tracked based on the slice read from the determined signal read position, and a specific positioning process is performed.

4 Claims, 9 Drawing Sheets

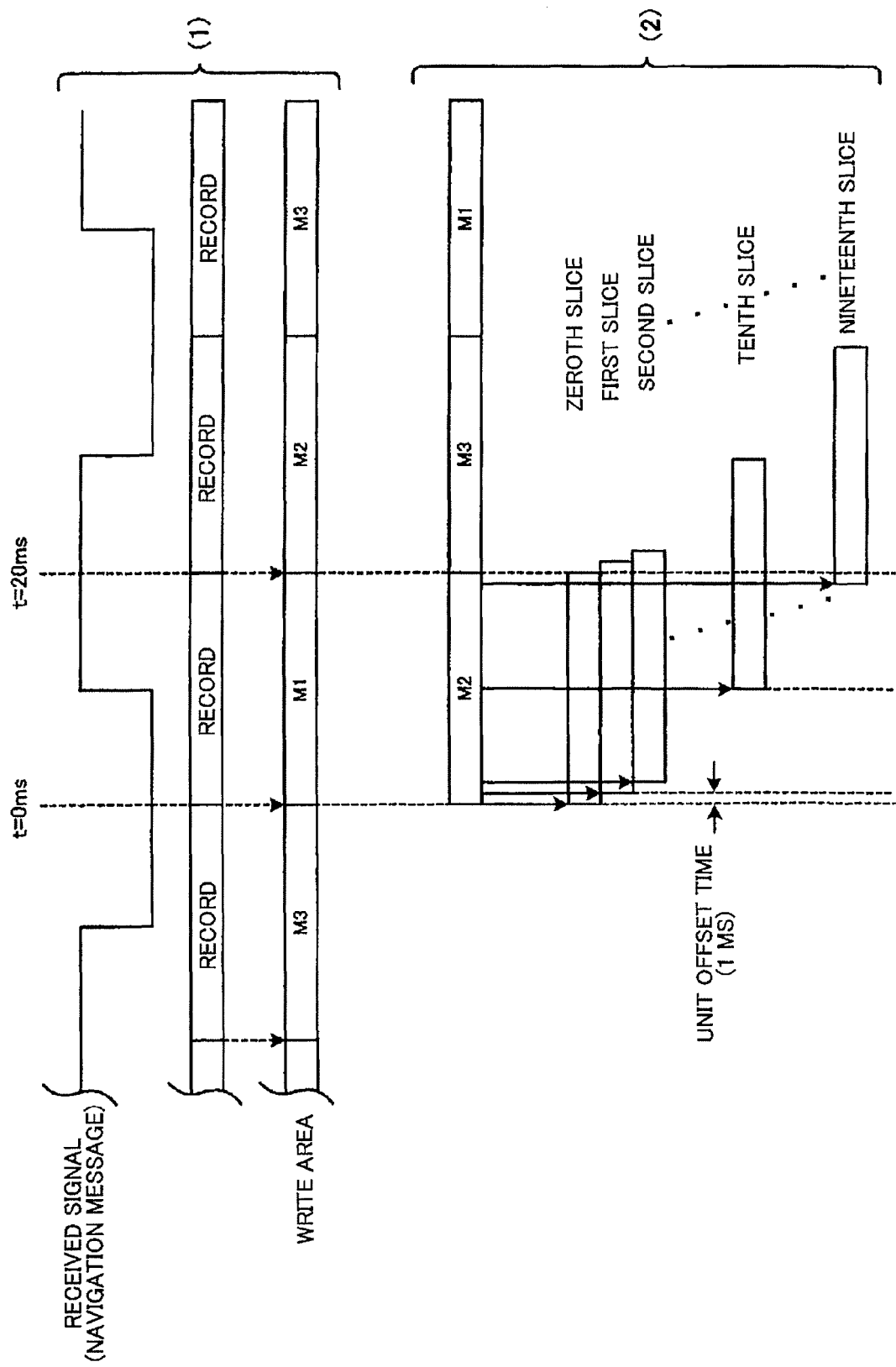

FIG. 9

| 8551 | 8553 |
|---|---|
| SATELLITE NO. | MAXIMUM STRENGTH READ OFFSET (MS) |
| 1 | 12 |
| 5 | 8 |
| 10 | 15 |
| ⋮ | ⋮ |

| 8571 | 8573 | | |
|---|---|---|---|
| SATELLITE NO. | SATELLITE INFORMATION | | |
| | POSITION | VELOCITY (M/S) | MOVING DIRECTION |
| 1 | (Xs1,Ys1,Zs1) | $3.88 \times 10^3$ | (Xvs1,Yvs1,Zvs1) |
| 5 | (Xs5Ys5,Zs5) | $3.88 \times 10^3$ | (Xvs5,Yvs5,Zvs5) |
| 9 | (Xs9,Ys9,Zs9) | $3.88 \times 10^3$ | (Xvs9,Yvs9,Zvs9) |
| ⋮ | ⋮ | ⋮ | ⋮ |

857

POSITIONING DEVICE, ELECTRONIC INSTRUMENT, AND STORAGE MEDIUM STORING PROGRAM

This is a continuation application of U.S. patent application Ser. No. 12/708,026, which claims priority to U.S. patent application Ser. No. 11/839,624 and Japanese Patent Application No. 2006-290819 filed on Aug. 16, 2007 and Oct. 26, 2006 respectively. The entire disclosure of U.S. patent application Ser. Nos. 12/708,026 and 11/839,624, and Japanese Patent Application No. 2006-290819 is hereby incorporated herein by reference.

BACKGROUND OF THE INVENTION

The present invention relates to a positioning device, an electronic instrument, and a storage medium storing a program.

A global positioning system (GPS) is widely known as a satellite positioning system, and is utilized for a car navigation system and the like. The GPS allows the present position to be located by acquiring/tracking a GPS satellite signal from signals received from a plurality of GPS satellites, and performing positioning calculations based on a navigation message acquired from the GPS satellite signal and the like.

The GPS satellite signal is a spread-spectrum-modulated signal called a coarse and acquisition (C/A) code. A method has been widely used which improves the signal reception sensitivity by correlating a pseudo spread code (code replica) generated by a receiver and the received signal over a long period of time when acquiring the GPS satellite signal.

However, since the polarity of the received signal is reversed every 20 milliseconds (ms) according to the navigation message, when the signal used for the correlation calculation is acquired across the polarity inversion portion, the signal component is necessarily cancelled (hereinafter called "cancellation portion"). This hinders an appropriate correlation process, whereby the signal reception sensitivity (hereinafter simply called "sensitivity") decreases.

JP-A-2005-321298 discloses technology which sequentially acquires signals while changing the signal acquisition timing from the signal reception start timing by a predetermined unit time, and selects the signal with the smallest cancellation portion.

However, since the technology disclosed in JP-A-2005-321298 uses a fixed unit time, the selected signal is cancelled to a large extent when the unit time is increased. For example, since a cancellation portion of up to 2.5 milliseconds occurs when the unit time is set at five milliseconds, the sensitivity cannot be increased.

On the other hand, the cancellation portion of the signal decreases by reducing the unit time. However, since the number of signals which must be calculated increases, the processing time increases to a large extent.

SUMMARY

According to one aspect of the invention, there is provided a positioning device comprising:

a memory which is a ring buffer which includes a storage area capable of storing three or more cycles of a signal corresponding to at least an inversion time interval of a navigation message and in which a signal received by an RF reception circuit section which receives a GPS satellite signal is sequentially stored while shifting a storage position; and a positioning section which reads the signal from the storage area while changing a signal read position, performs an acquisition and/or tracking process of the GPS satellite signal based on the read signal, and performs a specific positioning process.

According to another aspect of the invention, there is provided a positioning device comprising:

a memory which is a ring buffer in which a signal received by an RF reception circuit section which receives a GPS satellite signal is sequentially stored;

a set-unit signal strength calculation section which calculates a signal strength of each of M ($M \geq 2$) specific-time signal sets obtained at intervals of a specific set-to-set offset time, one specific-time signal set including N ($N \geq 2$) specific-time signals obtained from the storage area at intervals of a specific unit offset time;

a specific-time signal strength calculation section which calculates 1) the signal strength of each of the specific-time signals included in the specific-time signal set having a maximum strength calculated by the set-unit signal strength calculation section, or 2) the signal strength of each of the specific-time signals included in the specific-time signal set having the maximum strength and the specific-time signals preceding or subsequent to the specific-time signal set having the maximum strength; and a determination section which determines the read position from the memory used for the correlation process based on the position of the memory at which the specific-time signal is stored which has the maximum strength calculated by the specific-time signal strength calculation section;

the positioning device acquiring the GPS satellite signal by reading the signal from the read position determined by the determination section and performing the correlation process, and performing a specific positioning process.

BRIEF DESCRIPTION OF THE SEVERAL VIEWS OF THE DRAWING

FIG. 4 is a view illustrative of a signal read operation.

FIG. 9 is a view showing a data configuration example of satellite-unit maximum strength read offset data.

FIG. 10 is a view showing a data configuration example of satellite data.

DETAILED DESCRIPTION OF THE EMBODIMENT

Figure 1:
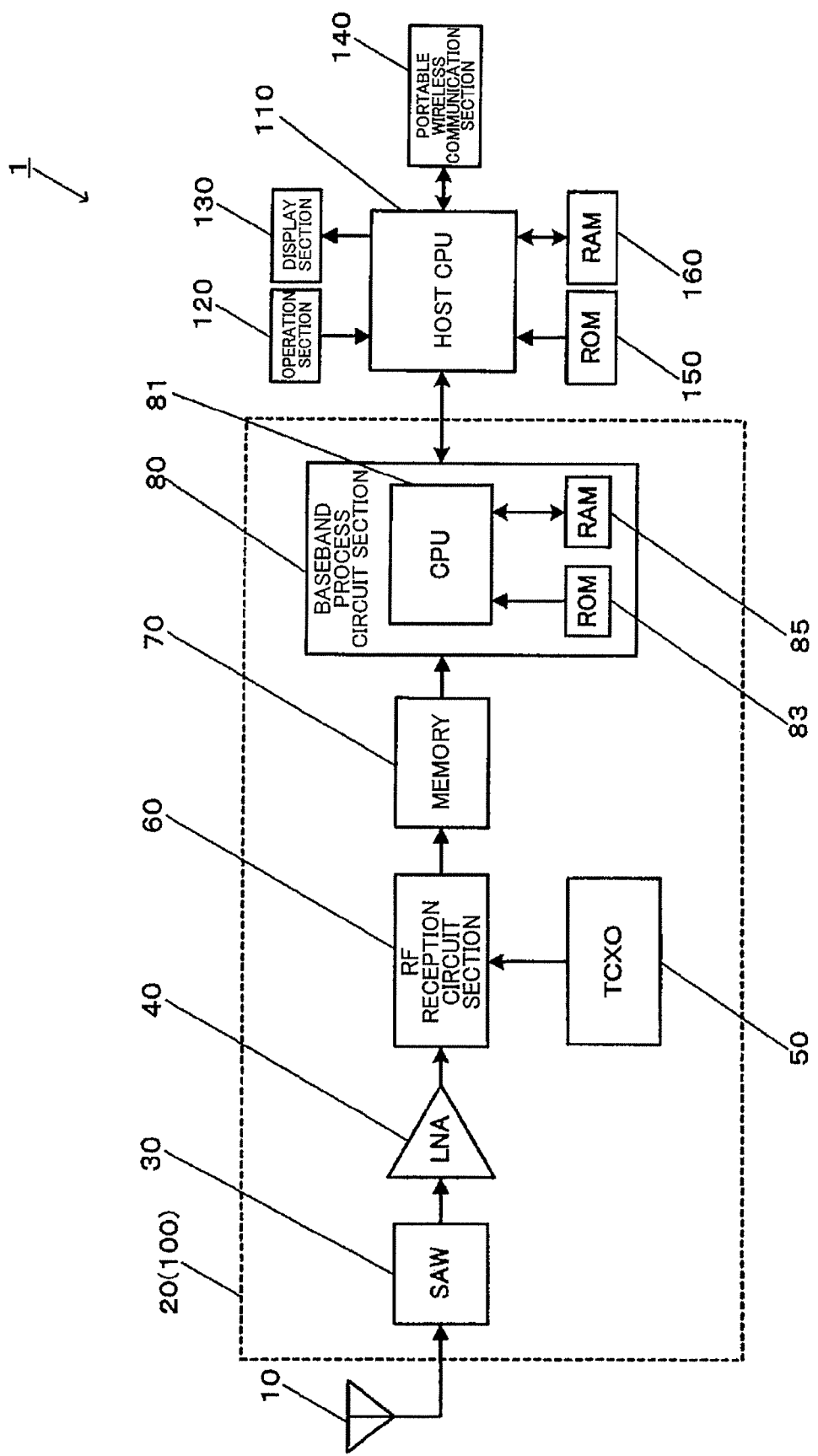
FIG. 1 is a block diagram showing the configuration of a portable telephone.

According to one embodiment of the invention, there is provided a positioning device comprising:

a memory which is a ring buffer which includes a storage area capable of storing three or more cycles of a signal corresponding to at least an inversion time interval of a navigation message and in which a signal received by an RF reception circuit section which receives a GPS satellite signal is sequentially stored while shifting a storage position; and a positioning section which reads the signal from the storage area while changing a signal read position, performs an acquisition and/or tracking process of the GPS satellite signal based on the read signal, and performs a specific positioning process.

According to one embodiment of the invention, there is provided a computer-readable storage medium storing a program for a positioning device including a memory which is a ring buffer which includes a storage area capable of storing three or more cycles of a signal corresponding to at least an inversion time interval of a navigation message and in which a signal received by an RF reception circuit section which receives a GPS satellite signal is sequentially stored while shifting a storage position, and a processor which can execute a program, the program causing the processor to function as a positioning section which reads the signal from the storage area while changing a signal read position, performs an acquisition and/or tracking process of the GPS satellite signal based on the read signal, and performs a specific positioning process.

According to the above configuration, the signal is read from the storage area of the memory (ring buffer) which can store three or more cycles of a signal while changing the signal read position. The GPS satellite signal is acquired and/or tracked based on the signal, and the specific positioning process is performed. For example, a signal with a small cancellation portion due to the polarity inversion of the navigation message can be acquired by reading the signal while sequentially changing the signal read position by one millisecond, whereby the sensitivity can be improved. Moreover, the processing time can be reduced by reading the signal corresponding to the inversion time interval of the navigation message from the storage area into which the signal is not written while writing the signal into the memory (ring buffer), for example.

In the positioning device, the GPS satellite signal received by the RF reception circuit section may include a signal transmitted from each of a plurality of satellites; and the positioning section may change the signal read position in units of acquisition and/or tracking target satellites.

In the storage medium, the GPS satellite signal received by the RF reception circuit section may include a signal transmitted from each of a plurality of satellites; and the positioning section may change the signal read position in units of acquisition and/or tracking target satellites.

According to the above configuration, since the signal read position is changed in units of acquisition and/or tracking target satellites, an appropriate signal can be read in units of satellites.

In the positioning device, the positioning section may include a read position determination section which changes a read position at which a signal for a specific period of time is read from the storage area, and determines a read position from the memory used for a correlation process for acquiring the GPS satellite signal based on a signal strength of the signal for the specific period of time read from each of the read positions; and the positioning section may acquire the GPS satellite signal by performing the correlation process for the signal read from the determined read position.

In the storage medium, the positioning section may include a read position determination section which changes a read position at which a signal for a specific period of time is read from the storage area, and determines a read position from the memory used for a correlation process for acquiring the GPS satellite signal based on a signal strength of the signal for the specific period of time read from each of the read positions; and the positioning section may acquire the GPS satellite signal by performing the correlation process for the signal read from the determined read position.

According to the above configuration, the read position from the memory used for the correlation process for acquiring the GPS satellite signal is determined based on the signal strength of the signal for the specific period of time read from the storage area of the memory while changing the read position. The GPS satellite signal is acquired by performing the correlation process for the signal read from the determined read position. Therefore, the GPS satellite signal can be acquired by performing the correlation process for the signal read from the read position at which the signal strength is maximum, for example.

In the positioning device, the read position determination section may include:

a set-unit signal strength calculation section which calculates a signal strength of each of M ($M \geq 2$) specific-time signal sets obtained at intervals of a specific set-to-set offset time, one specific-time signal set including N ($N \geq 2$) specific-time signals obtained from the storage area at intervals of a specific unit offset time;

a specific-time signal strength calculation section which calculates 1) the signal strength of each of the specific-time signals included in the specific-time signal set having a maximum strength calculated by the set-unit signal strength calculation section, or 2) the signal strength of each of the specific-time signals included in the specific-time signal set having the maximum strength and the specific-time signals preceding or subsequent to the specific-time signal set having the maximum strength; and a determination section which determines the read position from the memory used for the correlation process based on the position of the memory at which the specific-time signal is stored which has the maximum strength calculated by the specific-time signal strength calculation section.

In the storage medium, the read position determination section may include:

a set-unit signal strength calculation section which calculates a signal strength of each of M ($M \geq 2$) specific-time signal sets obtained at intervals of a specific set-to-set offset time, one specific-time signal set including N ($N \geq 2$) specific-time signals obtained from the storage area at intervals of a specific unit offset time;

a specific-time signal strength calculation section which calculates 1) the signal strength of each of the specific-time signals included in the specific-time signal set having a maximum strength calculated by the set-unit signal strength calculation section, or 2) the signal strength of each of the specific-time signals included in the specific-time signal set having the maximum strength and the specific-time signals preceding or subsequent to the specific-time signal set having the maximum strength; and a determination section which determines the read position from the memory used for the correlation process based on the position of the memory at which the specific-time signal is stored which has the maximum strength calculated by the specific-time signal strength calculation section.

According to the above configuration, the signal set for the specific period of time is acquired from the storage area of the memory while changing the acquisition timing, and the signal strength of each signal set is calculated. The signal strength of each signal included in the signal set having the maximum strength or the signal strength of each of the signals included in the signal set having the maximum strength and the signals preceding or subsequent to the signal set having the maximum strength are calculated, and the signal read position from the memory used for the correlation process is determined based on the position of the memory at which the signal having the maximum strength is stored. The number of calculations and the calculation time can be reduced by acquiring the signal sets while changing the acquisition timing, determining the signal set having the maximum strength, and specifying the signal having the maximum strength, whereby the signal having the maximum strength can be efficiently specified. Moreover, the signal having the maximum strength can be accurately determined by searching for not only the signals included in the signal set having the maximum strength, but also the signals preceding or subsequent to the signal set having the maximum strength.

According to one embodiment of the invention, there is provided a positioning device comprising:

a memory which is a ring buffer in which a signal received by an RF reception circuit section which receives a GPS satellite signal is sequentially stored;

a set-unit signal strength calculation section which calculates a signal strength of each of M (M≧2) specific-time signal sets obtained at intervals of a specific set-to-set offset time, one specific-time signal set including N (N≧2) specific-time signals obtained from the storage area at intervals of a specific unit offset time;

a specific-time signal strength calculation section which calculates 1) the signal strength of each of the specific-time signals included in the specific-time signal set having a maximum strength calculated by the set-unit signal strength calculation section, or 2) the signal strength of each of the specific-time signals included in the specific-time signal set having the maximum strength and the specific-time signals preceding or subsequent to the specific-time signal set having the maximum strength; and a determination section which determines the read position from the memory used for the correlation process based on the position of the memory at which the specific-time signal is stored which has the maximum strength calculated by the specific-time signal strength calculation section;

the positioning device acquiring the GPS satellite signal by reading the signal from the read position determined by the determination section and performing the correlation process, and performing a specific positioning process.

According to one embodiment of the invention, there is provided a computer-readable storage medium storing a program for a positioning device including a memory which is a ring buffer in which a signal received by an RF reception circuit section which receives a GPS satellite signal is sequentially stored, and a processor which can execute a program, the program causing the processor to function as:

a set-unit signal strength calculation section which calculates a signal strength of each of M (M≧2) specific-time signal sets obtained at intervals of a specific set-to-set offset time, one specific-time signal set including N (N≧2) specific-time signals obtained from the storage area at intervals of a specific unit offset time;

a specific-time signal strength calculation section which calculates 1) the signal strength of each of the specific-time signals included in the specific-time signal set having a maximum strength calculated by the set-unit signal strength calculation section, or 2) the signal strength of each of the specific-time signals included in the specific-time signal set having the maximum strength and the specific-time signals preceding or subsequent to the specific-time signal set having the maximum strength;

a determination section which determines the read position from the memory used for the correlation process based on the position of the memory at which the specific-time signal is stored which has the maximum strength calculated by the specific-time signal strength calculation section; and a positioning section which acquires the GPS satellite signal by reading the signal from the read position determined by the determination section and performing the correlation process, and performs a specific positioning process.

According to the above configuration, the signal set for the specific period of time is acquired from the memory (ring buffer) while changing the acquisition timing, and the signal strength of each signal set is calculated. The signal strength of each signal included in the signal set having the maximum strength or the signal strength of each of the signal included in the signal set having the maximum strength and the signals preceding or subsequent to the signal set having the maximum strength are calculated, and the read position from the memory used for the correlation process is determined based on the position of the memory at which the signal having the maximum strength is stored. The GPS satellite signal is acquired based on the signal read from the determined read position, and the specific positioning process is performed.

According to one embodiment of the invention, there is provided an electronic instrument comprising one of the above positioning devices.

A portable telephone including a positioning device and having a navigation function is described below with reference to the drawings as one embodiment of an electronic instrument. Note that the embodiments to which the invention can be applied are not limited thereto.

1. Configuration and Operation

FIG. 1 is a block diagram showing the functional configuration of a portable telephone 1 according to this embodiment. The portable telephone 1 includes a GPS antenna 10, a GPS reception section 20, a host central processing unit (CPU) 110, an operation section 120, a display section 130, a portable wireless communication section 140, a read only memory (ROM) 150, and a random access memory (RAM) 160.

The GPS antenna 10 is an antenna which receives an RF signal including a GPS satellite signal transmitted from a GPS satellite, and outputs the received RF signal to the GPS reception section 20.

The GPS reception section 20 includes a surface acoustic wave (SAW) section 30, a low noise amplifier (LNA) 40, a temperature-compensated crystal oscillator (TCXO) 50, a radio frequency (RF) reception circuit section 60, a memory 70, and a baseband process circuit section 80. The GPS reception section 20 forms a positioning device 100 which is a characteristic configuration according to this embodiment.

The RF reception circuit section 60 and the baseband process circuit section 80 of the GPS reception section 20 may be manufactured as different large scale integrated (LSI) circuits, or may be integrated on one chip. The entire GPS reception section 20 including the SAW section 30, the LNA 40, the TCXO 50, and the memory 70 may be integrated on one chip.

The SAW section 30 is a bandpass filter which allows only a specific frequency band component of the RF signal received through the GPS antenna 10 to pass through, and outputs the signal which has passed therethrough to the LNA 40.

The LNA 40 is a low noise amplifier which amplifies the signal which has passed through the SAW section 30, and outputs the amplified signal to the RF reception circuit section 60.

The TCXO 50 is a temperature-compensated crystal oscillator which generates an oscillation signal having a specific oscillation frequency, and outputs the generated oscillation signal to the RF reception circuit section 60.

The RF reception circuit section 60 generates an RF signal multiplication oscillation signal by dividing or multiplying the frequency of the oscillation signal input from the TCXO 50. The RF reception circuit section 60 down-converts the RF signal which has passed through the GPS antenna 10, the SAW section 30, and the LNA 40 into an intermediate-frequency signal (hereinafter called "IF signal") by multiplying the generated oscillation signal by the signal amplified by the LNA 40. After subjecting the IF signal to amplification and the like, the RF reception circuit section 60 converts the IF signal into a digital signal using an A/D converter, and outputs the digital signal to the memory 70.

The memory 70 is a buffer which stores the IF signal output from the RF reception circuit section 60. The configuration of the memory 70 is described later in detail.

The baseband process circuit section 80 is a circuit section which acquires/extracts the GPS satellite signal from the IF signal stored in the memory 70, decodes the data of the signal to acquire the navigation message, time information, and the like, and performs pseudo-range calculations, positioning calculations, and the like.

Figure 2:
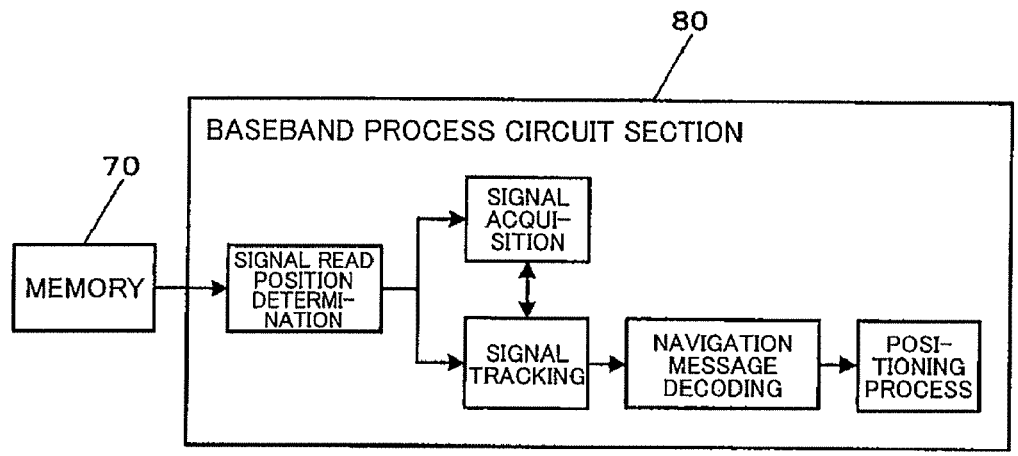
FIG. 2 is a view illustrative of the outline of a process performed by a baseband process circuit section.

FIG. 2 is a view illustrative of the outline of a process performed by the baseband process circuit section 80. The baseband process circuit section 80 determines the position at which the baseband process circuit section 80 starts to read the IF signal sequentially stored in the memory 70 (hereinafter called "signal read position").

The baseband process circuit section 80 acquires the GPS satellite signal based on the IF signal read from the determined signal read position. The baseband process circuit section 80 acquires the GPS satellite signal by extracting the GPS satellite signal from the IF signal. This process is implemented by subjecting the IF signal to fast Fourier transform (FFT) calculations and the like and performing a correlation process. In more detail, the baseband process circuit section 80 calculates the correlation value of a pseudo-generated spread code (code replica) and the IF signal by performing a coherent accumulation process.

When the GPS satellite signal has been acquired, the baseband process circuit section 80 tracks the acquired GPS satellite signal. The baseband process circuit section 80 tracks the GPS satellite signals by synchronously holding the acquired GPS satellite signals in parallel. For example, this process is implemented by tracking the phases of the C/A code and the carrier contained in the satellite signal using a code loop known as a delay locked loop (DLL) and a carrier loop known as a phase locked loop (PLL).

The baseband process circuit section 80 then decodes the data of the GPS satellite signal to acquire the navigation message, and locates the present position of the portable telephone 1 by performing pseudo-range calculations, positioning calculations, and the like (hereinafter called "positioning process").

The configuration of the memory 70 which is a characteristic portion according to this embodiment and the principle of the signal read position determination process performed by the baseband process circuit section 80 are described below.

Figure 3A:
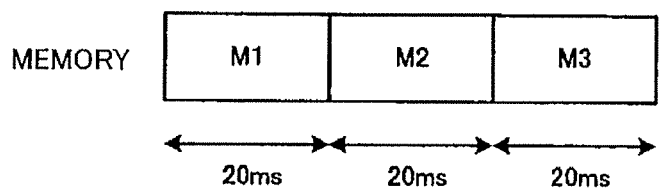
FIG. 3A is a view showing the configuration of a memory.
Figure 3B:
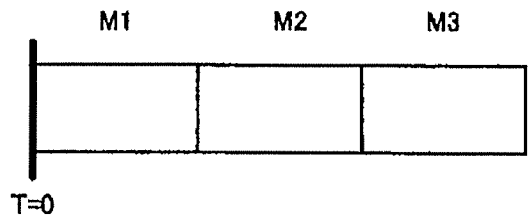
FIGS. 3B and 3C are views illustrative of a data write operation.
Figure 3C:
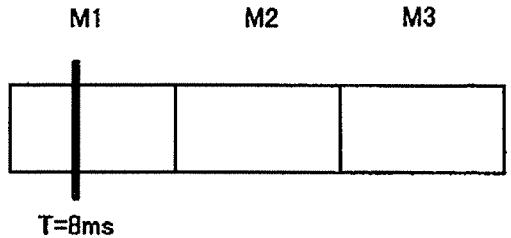

FIG. 3A is a view showing the configuration of the memory 70, and FIGS. 3B and 3C are views illustrative of an operation of writing the signal into the memory 70. The memory 70 includes storage areas M1 to M3, each of which can store a signal of which one cycle is 20 milliseconds. The IF signal output from the RF reception circuit section 60 is sequentially and consecutively stored in the storage areas M1 to M3 in order proceeding from the storage area M1. Specifically, the storage areas M1 to M3 are utilized as banks to which consecutive addresses are assigned.

Specifically, the position at which the signal is written (hereinafter called "write position") at a time T=0 is the head position of the storage area M1 (FIG. 3B). The write position proceeds toward the storage area M2 with the lapse of the time T (FIG. 3C). When the signal has been written into the entire storage area M3, the write position returns to the head position of the storage area M1. Specifically, the memory 70 is a ring buffer.

In the following description, a time length of 20 milliseconds of each storage area is called a "record". The present signal write target storage area of the memory 70 is called a "write area", and the storage area other than the write area from which the written signal can be read is called a "readable area".

FIG. 4 is a view illustrative of the concept of a slice. FIG. 4 is a view illustrative of an operation of writing the signal into the memory 70 and an operation of reading the signal stored in the memory 70. In FIG. 4, the signals have been written into the storage areas M2 and M3 at the time t=0. In FIG. 4, the upper portion (1) indicates the signal write operation, and the lower portion (2) indicates the signal read operation. The write (acquisition) timing of the received signal is rarely in synchronization with the inversion timing of the navigation message. In FIG. 4, the inversion timing of the navigation message occurs in the middle of each record.

In FIG. 4, the write position at the time t=0 is the head address of the storage area M1, and the storage area M1 is the write area from the time t=0 to the time t=20 (millisecond). Therefore, the storage areas M2 and M3 are readable areas in this period. The signal is read from the readable area as follows. Specifically, the head address of the readable area in which the signal has been stored first is determined to be a "read reference position". The data of one record is read while moving the read position away from the read reference position.

A plurality of readable areas are considered to be one area, and the data is read while moving the read position away (offset) from the head address (read reference position) of that area. For example, the read reference position in the period from the time t=0 to the time t=20 (millisecond) in FIG. 4 is the head address of the storage area M2. The readable areas M2 and M3 are considered to be one area, and the signal is read from that area.

In the following description, the amount of offset from the read reference position is called a "read offset". The read offset is determined in millisecond units. Note that the read offset actually indicates the amount of address offset of the memory.

The signal read operation and the slice are described in more detail with reference to FIG. 4. The signal is read in units of signals (data) of 20 milliseconds which is the inversion cycle of the navigation message. The signal of 20 milliseconds read from the memory 70 is called a "slice".

The slice is read from the position separated from the read reference position by the read offset which is changed by a specific unit offset time (millisecond). For example, when the unit offset time is one millisecond and the signal is sequentially read for 20 milliseconds while changing the read offset by one millisecond, twenty slices (i.e., zeroth slice to nineteenth slice) shown in FIG. 4 are obtained in total.

Figure 5:
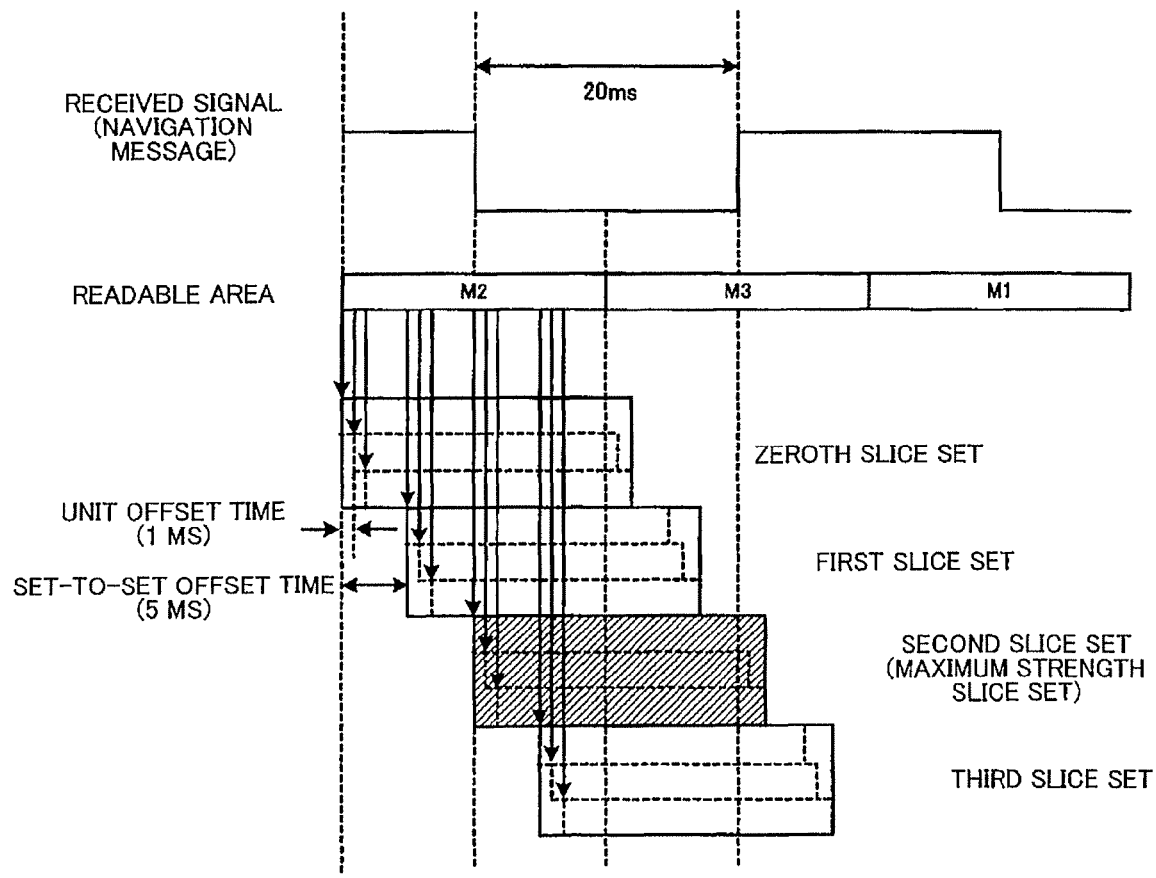
FIG. 5 is another view illustrative of a signal read operation.

FIG. 5 is a view illustrative of the signal read operation of the baseband process circuit section 80 according to this embodiment. The baseband process circuit section 80 reads the signal according to the above-described procedure. When the baseband process circuit section 80 has read N (hereinafter called "set-forming slice count") signals specified in advance, the baseband process circuit section 80 combines the slices to form a slice set.

The baseband process circuit section 80 changes the read offset from the read offset of the first slice included in the slice set by a specific set-to-set offset time (millisecond), and reads the signal according to the same procedure as described above to form the next slice set. The baseband process circuit section 80 repeats the above procedure until a time length of 20 milliseconds is covered to obtain M (hereinafter called "slice set count") slice sets in total.

For example, when the unit offset time is one millisecond, the set-forming slice count is three, and the set-to-set offset time is five milliseconds, four slice sets (i.e., zeroth slice set to third slice set) shown in FIG. 5 are obtained in total. In this case, the slice set count M is four.

The baseband process circuit section 80 calculates the total value of the signal strengths of the slices included in the slice set (hereinafter called "signal strength total value") in units of the M slice sets, and specifies the slice set having the maximum signal strength total value (hereinafter called "maximum strength slice set"). In FIG. 5, since the slices included in the second slice set have the minimum cancellation portion due to the polarity inversion of the received signal (navigation message), the second slice set has the maximum signal strength total value. Therefore, the second slice set is the maximum strength slice set.

The signal strength of the slice can be calculated using a coherent accumulation process, for example. The coherent accumulation process is a calculation process of coherently summing up the sums of squares of the components I and Q of the signal over a specific coherent accumulation time (e.g. 20 milliseconds).

The baseband process circuit section 80 sets a specific read target range including the position at which the maximum strength slice set is stored, and reads the signal within the read target range while changing the read offset from the read reference position by the unit offset time. The baseband process circuit section 80 calculates the signal strength of each acquired slice, and specifies the slice with the maximum signal strength (hereinafter called "maximum strength slice").

Figure 6:
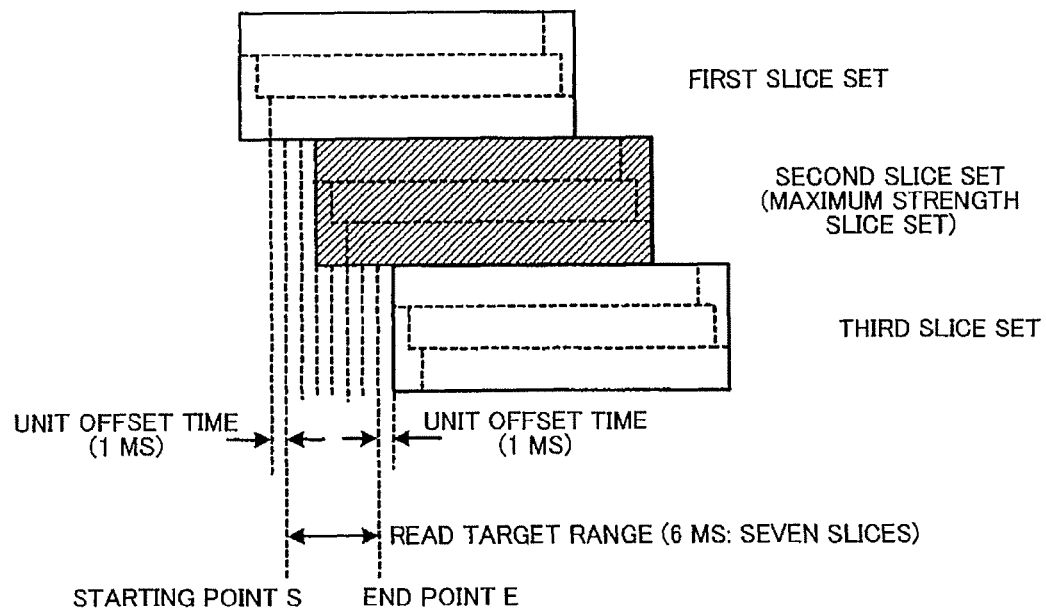
FIG. 6 is a view illustrative of a read target range.

FIG. 6 is a view illustrative of the read target range, and shows some of the slice sets shown in FIG. 5. The starting point of the read target range is the position obtained by adding the unit offset time to the read offset of the last slice included in the slice set preceding the maximum strength slice set. The end point of the read target range is the position obtained by subtracting the unit offset time from the read offset of the first slice included in the slice set subsequent to the maximum strength slice set. In FIG. 6, a range of six milliseconds from the starting point S to the end point E is the read target range, and the signal strengths of seven slices in total read from the read target range are calculated.

After specifying the maximum strength slice, the baseband process circuit section 80 determines the read offset of the maximum strength slice to be the maximum strength read offset. The baseband process circuit section 80 then determines the area of the memory 70 into which the signal is currently written (write area) to determine the area from which the signal can be read (readable area). The baseband process circuit section 80 considers a plurality of readable areas to be one area, and determines the position separated from the head address (read reference position) by the maximum strength read offset to be the signal read position.

The calculation results of the signal strength of the slice while changing the read offset are described below.

Figure 7A:
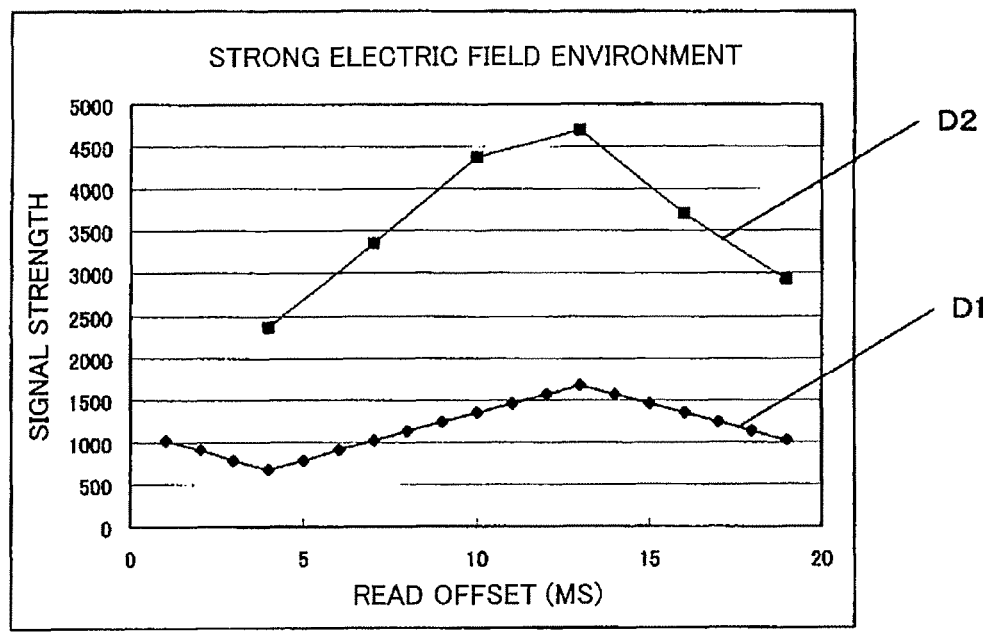
FIG. 7A is a view showing results obtained in a strong electric field environment.
Figure 7B:
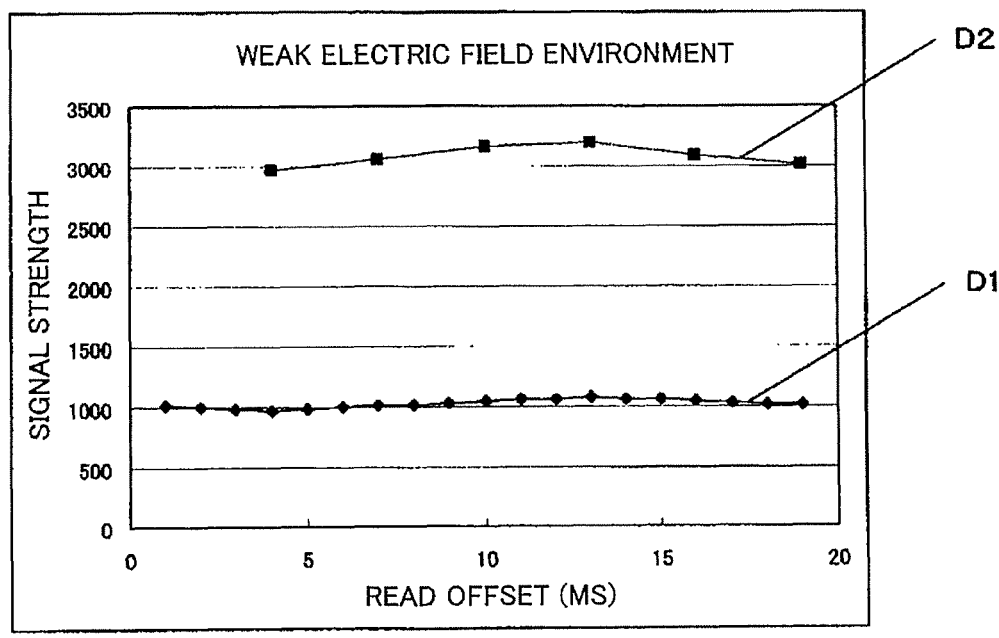
FIG. 7B is a view showing results obtained in a weak electric field environment.

FIG. 7A is a view showing the results obtained in an environment in which a high-strength signal can be received from the GPS satellite (hereinafter called "strong electric field environment"), and FIG. 7B is a view showing the results obtained in an environment in which a high-strength signal cannot be received from the GPS satellite (hereinafter called "weak electric field environment"). In FIGS. 7A and 7B, the horizontal axis indicates the read offset (millisecond), and the vertical axis indicates the signal strength of the slice and the signal strength total value of the slice set.

Data D1 indicates the results of the signal strengths of twenty slices obtained when the unit offset time is set at one millisecond. The results indicate that the signal strength of the slice when the read offset is 13 milliseconds is maximum. Therefore, it is estimated that the position separated from the read reference position by a read offset of 13 milliseconds corresponds to the polarity inversion position of the received signal (navigation message).

Data D2 indicates the results of the signal strength total values of six slice sets when the unit offset time is set at one millisecond, the set-to-set offset time is set at three milliseconds, and the set-forming slice count is set at three. In this case, the signal strength total value of the slice set when the read offset is 13 milliseconds is maximum. This indicates that the polarity inversion position of the received signal (navigation message) can be accurately estimated using the method according to this embodiment.

The method according to this embodiment is particularly useful for the weak electric field environment. As is clear from the results shown in FIG. 7B, when separately calculating the signal strengths of twenty slices, since the slices show a small variation in signal strength, it is difficult to identify the maximum strength. Therefore, it is difficult to specify the maximum strength slice compared with the strong electric field environment.

On the other hand, the signal strength total values of the slice sets show a large variation since the signal strengths of three slices of each slice set are summed up. Therefore, the maximum strength slice set can be easily specified. Since the maximum strength slice is likely to be included in the maximum strength slice set, it is possible to efficiently search for the maximum strength slice.

As is clear from the number of plots shown in FIGS. 7A and 7B, the number of signal strength calculations is smaller for the data D2 than the data D1. Specifically, the number of calculations and the calculation time can be reduced by determining the maximum strength slice set utilizing the slice sets and specifying the maximum strength slice, whereby the maximum strength slice can be efficiently specified.

The baseband process circuit section 80 includes a circuit which performs the correlation process, a circuit which generates the spread code (code replica) for performing correlation calculations, a circuit which decodes data, a CPU 81 which controls each section of the baseband process circuit section 80 and the RF reception circuit section 60 and performs various calculations including a baseband process described later, a ROM 83, and a RAM 85.

Figure 8A:
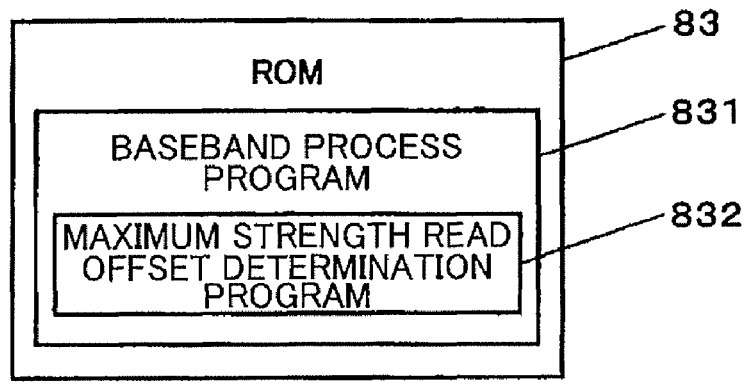
FIG. 8A is a view showing the configuration of a ROM.
Figure 8B:
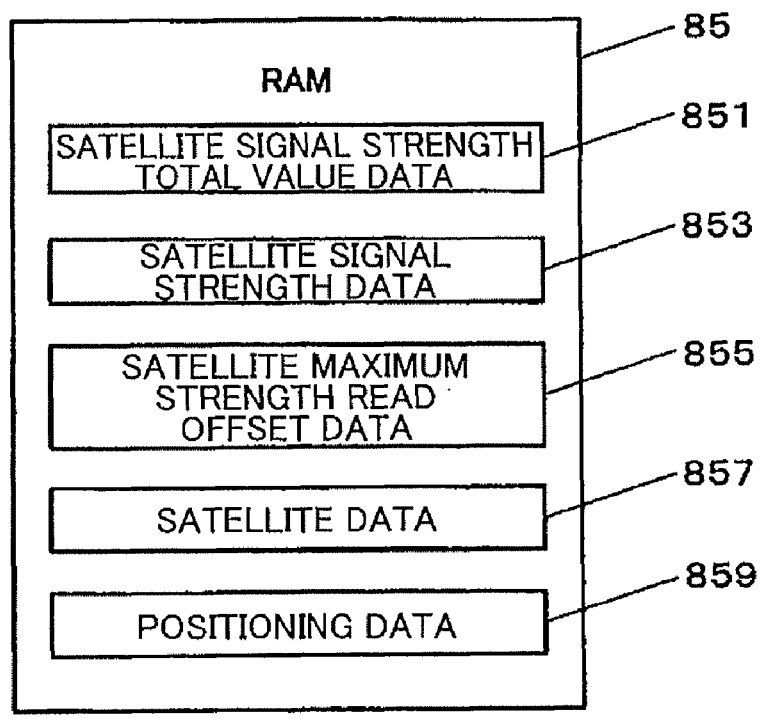
FIG. 8B is a view showing the configuration of a RAM.

FIGS. 8A and 8B are views showing examples of data stored in the ROM 83 and the RAM 85 included in the baseband process circuit section 80. The ROM 83 stores a baseband process program 831 which is read by the CPU 81 and executed as the baseband process (see FIG. 11). A maximum strength read offset determination program 832 executed as a maximum strength read offset determination process (see FIG. 12) is included in the baseband process program 831 as a subroutine.

The baseband process is a process in which the CPU 81 determines the signal read position of the signal received from each acquisition target GPS satellite (hereinafter called "acquisition target satellite"), performs an acquisition/tracking process of the GPS satellite signal, a navigation message decoding process, and the like based on the signal read from the signal read position, and locates the present position of the portable telephone 1. The baseband process is described later in detail using a flowchart.

The maximum strength read offset determination process is a process in which the CPU 81 sequentially reads the signal stored in the memory 70 to form slice sets, and specifies the maximum strength slice based on the signal strength total value of each slice set to determine the maximum strength read offset. The maximum strength read offset determination process is also described later in detail using a flowchart.

The RAM 85 stores satellite-unit signal strength total value data 851, satellite-unit signal strength data 853, satellite-unit maximum strength read offset data 855, satellite data 857, and positioning data 859.

The satellite-unit signal strength total value data 851 is data in which the signal strength total value of each slice set acquired from the memory 70 is stored in units of acquisition target satellites. The satellite-unit signal strength total value data 851 is updated each time the signal strength total value of the slice set is calculated in the maximum strength read offset determination process.

The satellite-unit signal strength data 853 is data in which the signal strength of each slice acquired from the memory 70 is stored in units of acquisition target satellites. The satellite-unit signal strength data 853 is updated each time the signal strength of the slice is calculated in the maximum strength read offset determination process.

FIG. 9 is a view showing a data configuration example of the satellite-unit maximum strength read offset data 855. An acquisition target satellite number 8551 and a maximum strength read offset 8553 determined for the acquisition target satellite are stored as the satellite-unit maximum strength read offset data 855 while being associated with each other. The satellite-unit maximum strength read offset data 855 is updated when the maximum strength read offset is determined in the maximum strength read offset determination process.

FIG. 10 is a view showing a data configuration example of the satellite data 857. An acquisition target satellite number 8571 and satellite information 8573 including the position, the velocity, and the moving direction of the acquisition target satellite are stored as the satellite data 857 while being associated with each other. The position of the acquisition target satellite is indicated by three-dimensional coordinates in the terrestrial reference frame, and the moving direction is indicated by a three-dimensional unit vector in the terrestrial reference frame, for example. The satellite data 857 is updated each time the satellite information is calculated in the baseband process.

The positioning data 859 is data of the located position of the portable telephone 1. For example, three-dimensional coordinates in the terrestrial reference frame are stored as the positioning data 859. The present position located by the positioning process during the baseband process is stored as the positioning data 859 in time series.

The host CPU 110 is a processor which controls each section of the portable telephone 1 according to various programs such as a system program stored in the ROM 150. The host CPU 110 mainly controls the telephone function and causes the display section 130 to display a navigation screen in which the present position of the portable telephone 1 located by the baseband process circuit section 80 is plotted.

The operation section 120 is an input device including an operation key, a button switch, and the like, and outputs a press signal to the host CPU 110. Various instruction inputs such as a telephone call request or a navigation screen display request are performed by operating the operation section 120.

The display section 130 is a display device which includes a liquid crystal display (LCD) or the like and displays various images based on a display signal input from the host CPU 110. The display section 130 displays date/time information, the navigation screen, and the like.

The portable wireless communication section 140 is a known communication circuit section implemented by an antenna through which a radio signal is transmitted and received between the portable wireless communication section 140 and a radio base station installed by a portable telephone communication service provider, an RF converter, and the like. The portable wireless communication section 140 transmits and receives a radio signal under control of the host CPU 110 to implement a telephone call and e-mail transmission/reception.

The ROM 150 is a read-only storage device. The ROM 150 stores data and various programs such as a system program for controlling the portable telephone 1, a program for implementing a telephone call and e-mail transmission/reception, and a program for implementing a navigation function. The host CPU 110 performs the processes according to these programs and data.

The RAM 160 is a readable/writable storage device. The RAM 160 forms a work area for temporarily storing the system program executed by the host CPU 110, various programs, data during various processes, processing results, and the like.

2. Process Flow

Figure 11:
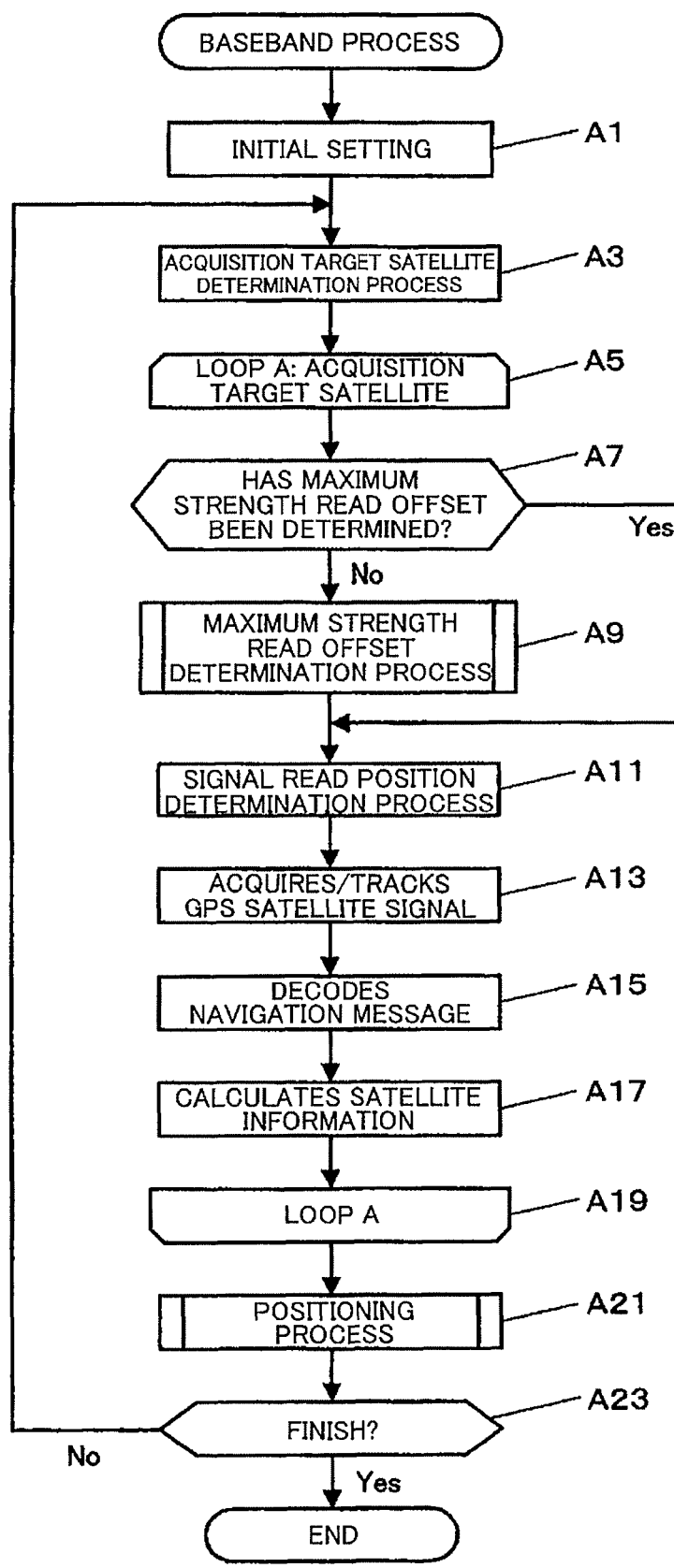
FIG. 11 is a flowchart showing the flow of a baseband process.

FIG. 11 is a flowchart showing the flow of the baseband process performed by the baseband process circuit section 80 by causing the CPU 81 to read and execute the baseband process program 831 stored in the ROM 83. In the baseband process, after reception of the RF signal through the GPS antenna 10, down-conversion of the RF signal into the IF signal by the RF reception circuit section 60, and the like, the GPS reception section 20 is in a state in which the data of the signal is stored in the memory 70 at any time.

The CPU 81 performs the following initial settings (step A1). Specifically, the CPU 81 sets specific values as the unit offset time, the set-to-set offset time, the set-forming slice count, and the slice set count.

The CPU 81 performs the acquisition target satellite determination process (step A3). Specifically, the CPU 91 determines the GPS satellite from which the signal can be received based on the orbital information of the GPS satellite such as an almanac, and adds a new acquisition target satellite or excludes a GPS satellite considered to be positioned outside the acquisition range from the acquisition target satellites.

The CPU 81 executes a loop A in units of the acquisition target satellites (steps A5 to A19). In the loop A, the CPU 81 determines whether or not the maximum strength read offset of the acquisition target satellite has been determined (step A7). When the CPU 81 has determined that the maximum strength read offset of the acquisition target satellite has been determined (step A7: Yes), the CPU 81 transitions to the step A11.

When the CPU 81 has determined that the maximum strength read offset of the acquisition target satellite has not been determined (step A7: No), the CPU 81 performs the maximum strength read offset determination process by reading and executing the maximum strength read offset determination program 832 stored in the ROM 83 (step A9).

Figure 12:
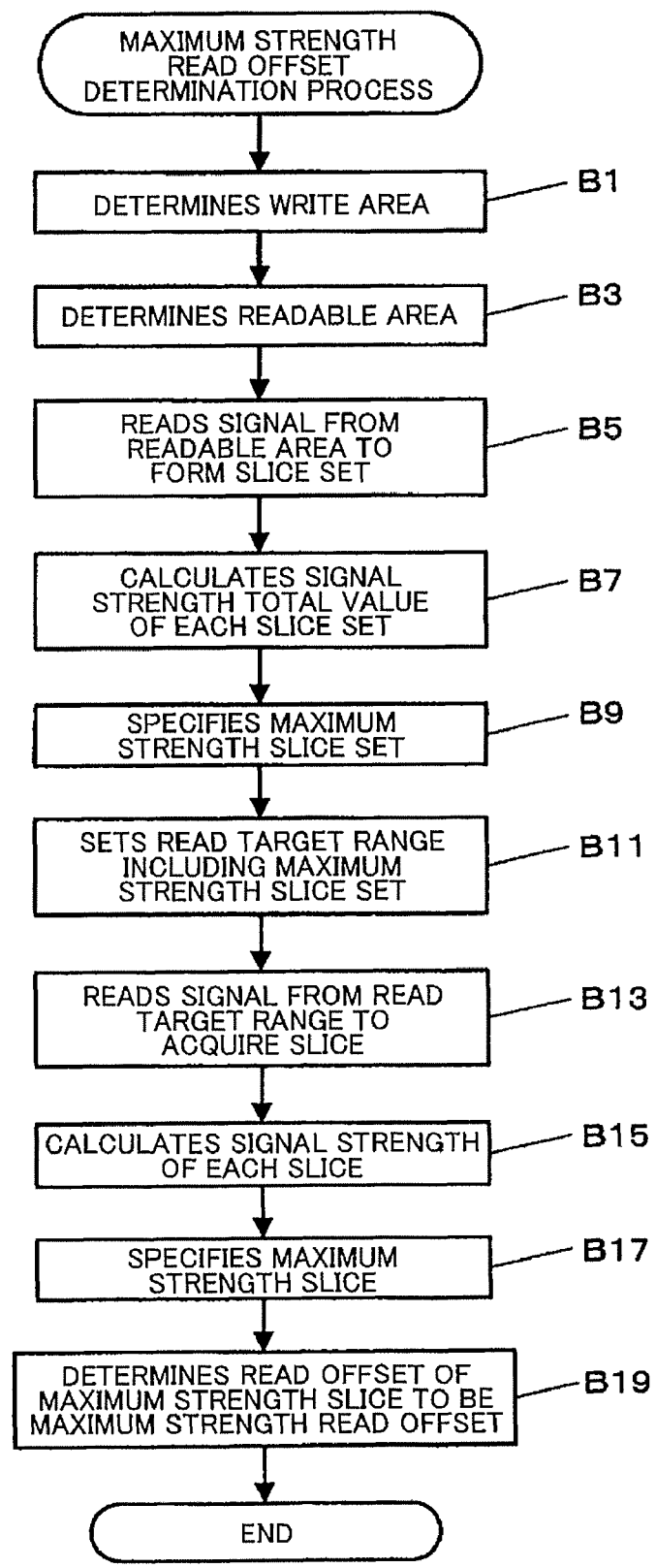
FIG. 12 is a flowchart showing the flow of a maximum strength read offset determination process.

FIG. 12 is a flowchart showing the flow of the maximum strength read offset determination process.

The CPU 81 determines the present signal write target storage area to be the write area (step B1). The CPU 81 then determines the readable area of the memory 70 (step B3). Specifically, the CPU 81 determines the storage area excluding the write area to be the readable area.

The CPU 81 sequentially reads the signal from the position obtained by adding the read offset to the read reference position of the readable area while changing the read offset to form a slice set (step B5), and calculates the signal strength total value of each slice set (step B7). The CPU 81 stores the calculated signal strength total value as the satellite-unit signal strength total value data 851 in the RAM 85 while associating the signal strength total value with the acquisition target satellite number.

The CPU 81 specifies the maximum strength slice set (step B9), and sets a specific range including the maximum strength slice set to be the read target range (step B11). The read target range is set using the method described with reference to FIG. 6.

The CPU 81 reads the signal from the position within the set read target range obtained by adding the read offset to the read reference position while changing the read offset by the unit offset time to sequentially acquire slices (step B13). The CPU 81 calculates the signal strength of each acquired slice (step B15).

The CPU 81 specifies the maximum strength slice (step B17), and determines the read offset of the maximum strength slice to be the maximum strength read offset 8553 (step B19). The CPU 81 stores the determined maximum strength read offset 8553 as the satellite-unit maximum strength read offset data 855 in the RAM 85 while associating the maximum strength read offset 8553 with the acquisition target satellite number 8551, and finishes the maximum strength read offset determination process.

Again referring to the baseband process shown in FIG. 11, after completion of the maximum strength read offset determination process, the CPU 81 performs the signal read position determination process (step A11). Specifically, the CPU 81 determines the present write area of the memory 70, and determines the storage area excluding the write area to be the readable area. The CPU 81 considers a plurality of readable areas to be one area, and determines the position obtained by adding the maximum strength read offset to the head address of that area to be the signal read position.

The CPU 81 acquires/tracks the GPS satellite signal (step A13). Specifically, the CPU 81 reads the IF signal stored in the memory 70 from the signal read position determined by the signal read position determination process, and extracts the GPS satellite signal by subjecting the read IF signal to FFT calculations and the like and performing the correlation process.

In more detail, the CPU 81 calculates the correlation value of the IF signal read from the signal read position and the spread code by performing the coherent accumulation process, and specifies the carrier frequency of the received signal by extracting the frequency component with the largest amplitude. The CPU 81 synchronously holds the extracted GPS satellite signals in parallel using the code loop and the carrier loop.

The CPU 81 decodes the data of the acquired GPS satellite signal to acquire the navigation message (step A15), and calculates the position, the velocity, and the moving direction of the acquisition target satellite based on the navigation message to obtain the satellite information 8573 (step A17). The CPU 81 stores the calculated satellite information 8573 as the satellite data 857 in the RAM 85 while associating the satellite information 8573 with the acquisition target satellite number 8571, and processes the next acquisition target satellite.

After the CPU 81 has performed the process in the steps A7 to A17 for all of the acquisition target satellites, the CPU 81 finishes the loop A. The CPU 81 performs known positioning calculations based on the satellite information 8573 of each acquisition target satellite calculated in the step A17, and locates the present position of the portable telephone 1 (step A21). The CPU 81 stores the located present position as the positioning data 859 in the RAM 85.

The CPU 81 determines whether or not to finish the process (step A23). Specifically, the CPU 81 finishes the process when a process finish instruction signal is input from the host CPU 110 in response to an instruction operation disabling the navigation function or an instruction operation removing power from the portable telephone 1 using the operation section 120, for example.

When the CPU 81 has determined to continue the process (step A23: No), the CPU 91 returns to the step A3. When the CPU 81 has determined to finish the process (step A23: Yes), the CPU 81 finishes the baseband process.

3. Effect

According to this embodiment, a slice set for a specific period of time is acquired from the storage area of the memory 70 (ring buffer) while changing the read position, and the signal strength total value of each slice set is calculated. The signal strengths of the slices included in the maximum strength slice set and the signal strengths of the slices preceding or subsequent to the maximum strength slice set are calculated, and the final signal read position is determined based on the read offset of the maximum strength slice. The GPS satellite signal is acquired/tracked based on the slice read from the determined signal read position, and the specific positioning process is then performed.

Since the maximum strength slice is a slice having the smallest cancellation portion due to the polarity inversion of the received signal, sensitivity can be improved by determining the final signal read position based on the read offset of the maximum strength slice. Moreover, since the signal is read from the storage area into which the signal is not written while writing the signal into the memory 70 (ring buffer), the processing time can be reduced.

The number of calculations and the calculation time can be reduced by acquiring the slice sets while changing the acquisition timing, determining the maximum strength slice set, and specifying the maximum strength slice, whereby the maximum strength slice can be efficiently specified. The maximum strength slice can be accurately determined by searching for not only the slices included in the maximum strength slice set, but also the slices adjacent to the maximum strength slice set.

4. Modification 4-1. Application Example

The invention may be applied to various electronic instruments such as a personal digital assistant (PDA), a portable navigation system, and a car navigation system in addition to the portable telephone.

4-2. Processor

This embodiment has been described above taking an example in which the processor which controls the baseband process circuit section 80 is a CPU. Note that the processor may be a digital signal processor (DSP), for example.

4-3. Memory

This embodiment has been described above taking an example in which the memory 70 includes three storage areas. Note that four or more storage areas may be provided so that four or more cycles of signals can be stored. In this case, the signal write/read operations are the same as described above.

4-4. Host CPU

The host CPU 110 may perform some or all of the processes performed by the CPU 81 of the baseband process circuit section 80 by means of software. For example, the host CPU 110 may perform the maximum strength read offset determination process and the signal read position determination process, and the CPU 81 of the baseband process circuit section 80 may perform the acquisition/tracking process of the GPS satellite signal, the positioning process, and the like by reading the signal stored in the memory 70 from the signal read position determined by the host CPU 110. The host CPU 110 may perform the positioning process based on the GPS satellite signal acquired/tracked by the CPU 81.

4-5. Parameter

The unit offset time, the set-to-set offset time, the set-forming slice count, and the slice set count described in this embodiment are only examples, and may be appropriately set. For example, the set-to-set offset time may be set at one millisecond, and the maximum strength slice may be specified from the slices of the maximum strength slice set.

4-6. Signal Strength Average Value

This embodiment has been described above taking an example in which the maximum strength slice set is specified based on the signal strength total values of the slice sets. Note that the average value of the signal strengths of the slices included in the slice set (hereinafter called "signal strength average value") may be calculated instead of the signal strength total value, and the slice set having the maximum signal strength average value may be specified.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A receiver comprising:
   a reception circuit section that receives a signal from a positioning satellite;
   a memory that stores a received signal that has been received by the reception circuit section;
   a set-unit signal strength calculation section that calculates a signal set having a maximum signal strength from a plurality of signal sets, each of the plurality of signal sets including two or more received signals for a specific period of time that differ in storage position in the memory;
   a specific-time signal strength calculation section that calculates a received signal for the specific period of time having the maximum signal strength from the received signals for the specific period of time included in the signal set having the maximum signal strength and the received signals stored at storage positions preceding or subsequent to that of the signal set having the maximum signal strength; and
   a determination section that determines a read start position of the received signal for the specific period of time calculated by the specific-time signal strength calculation section to be a read start position used for a correlation process for acquiring the signal from the positioning satellite.

2. The receiver as defined in claim 1,
   the set-unit signal strength calculation section calculating the signal set having the maximum signal strength from M (M≧2) signal sets stored at storage positions that differ by a specific set-to-set offset time, each of the plurality of signal sets including N (N≧2) received signals for the specific period of time that are stored at storage positions that differ from a reference position at intervals of a specific unit offset time.

3. An electronic instrument comprising the receiver as defined in claim 1.

4. An electronic instrument comprising the receiver as defined in claim 2.

* * * * *